(12) United States Patent
Taylor et al.

(10) Patent No.: US 6,321,627 B1
(45) Date of Patent: *Nov. 27, 2001

(54) SAWING APPARATUS

(75) Inventors: Gary R. Taylor; Paul Wierzba, both of Calgary (CA)

(73) Assignee: Balance Investments Ltd., Guernsey (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/881,748

(22) Filed: Jun. 24, 1997

Related U.S. Application Data

(63) Continuation of application No. 08/480,288, filed on Jun. 7, 1995, now Pat. No. 6,035,758.

(51) Int. Cl.[7] ..................................................... B27B 5/32
(52) U.S. Cl. .............................. 83/665; 83/676; 83/698.41
(58) Field of Search .............................. 83/665, 666, 676, 83/425.4, 508.2, 508.3, 698.41, 835; 30/388; 403/359.1, 458

(56) References Cited

U.S. PATENT DOCUMENTS

| 1,251,844 | 1/1918 | Trout | 83/665 |
|---|---|---|---|
| 1,357,030 | 10/1920 | Currier | 83/838 |
| 2,006,106 | * 6/1935 | Markert | 83/665 X |
| 2,600,459 | * 6/1952 | Adams | 83/665 |
| 3,415,153 | 12/1968 | Steiner | 411/512 |
| 3,440,915 | 4/1969 | Weyant | 83/666 |
| 3,619,882 | 11/1971 | Sobanski et al. | 29/893.35 |
| 3,703,915 | 11/1972 | Pearson | 83/824 |
| 4,006,671 | 2/1977 | Ochs | 83/504 X |

(List continued on next page.)

FOREIGN PATENT DOCUMENTS

| 1015246 | 8/1977 | (CA) . |
|---|---|---|
| 1256001 | 6/1989 | (CA) . |
| 2032908 | 7/1991 | (CA) . |
| 1312532 | 1/1993 | (CA) . |
| 199811 | 6/1908 | (DE) . |
| 515574 | 2/1955 | (IT) . |
| 5-38621 | 2/1993 | (JP) . |

Primary Examiner—Clark F. Dexter
(74) Attorney, Agent, or Firm—Burns, Doane, Swecker & Mathis, L.L.P.

(57) ABSTRACT

A sawblade apparatus includes a sawblade and an arbor. The arbor which is adapted to have the sawblade mounted thereon possesses a plurality of outer drive surfaces circumferentially spaced about the outer periphery of the arbor. The sawblade is provided with a centrally located mounting hole that is bounded by a plurality of inner driven surfaces circumferentially spaced about the mounting hole for operatively engaging the outer drive surfaces on the arbor when the arbor is rotatably driven so that rotation of the arbor results in rotation of the sawblade in a rotational direction. The inner driven surfaces operatively engage the outer drive surfaces at respective interfaces to produce an interface force during operation of the sawing apparatus. The mounting hole in the sawblade has an inner diameter that is greater than the outer diameter of the arbor so that during a cutting operation the outer peripheral surface of the arbor is spaced from the inner peripheral surface of the mounting hole in the sawblade. The drive surfaces and the driven surfaces are configured to produce a radially inwardly directed radial component of the interface force at the interfaces during operation of the sawing apparatus.

9 Claims, 9 Drawing Sheets

U.S. PATENT DOCUMENTS

| | | | |
|---|---|---|---|
| 4,572,291 | 2/1986 | Robison | 166/173 |
| 4,657,428 | 4/1987 | Wiley | 83/665 X |
| 4,730,952 | 3/1988 | Wiley | 83/665 X |
| 4,798,268 | 1/1989 | Fargier et al. | 188/71.5 |
| 4,826,090 | 5/1989 | Orphall | 83/698.41 X |
| 4,977,793 | 12/1990 | Husted | 74/567 |
| 5,165,881 | 11/1992 | Wicen | 418/152 |
| 5,522,441 | 6/1996 | Anselm et al. | 83/665 X |
| 5,702,415 | 12/1997 | Matthai et al. | 83/676 X |
| 5,799,558 * | 9/1998 | Hewitt et al. | 83/665 |
| 6,035,758 * | 3/2000 | Taylor et al. | 83/665 |

* cited by examiner

SAWING APPARATUS

FIELD OF THE INVENTION

This application is a continuation of U.S. application Ser. No. 08/480,288, filed on Jun. 7, 1995, now U.S. Pat. No. 6,035,758.

This invention generally relates to sawblade drive systems. More particularly, the present invention concerns sawblade drive systems that include a sawblade and an arbor on which the sawblade is mounted, and the way in which the sawblade and the arbor are configured to achieve a variety of advantages.

BACKGROUND OF THE INVENTION

Circular type sawblades are used for cutting cants or lumber. These circular sawblades are typically provided with a mounting hole or eye, and an arbor is positioned in this mounting hole so that the sawblade is mounted on the arbor. The arbor is also rotatably connected to a source of drive power. In this way, the operation of the power source causes rotation of the arbor which in turn causes rotation of the circular sawblade.

The circular sawblade and the arbor are operatively connected to one another so that the rotation of the latter results in rotation of the former. In known types of circular sawblades, this operative connection is typically provided by projections extending outwardly from the outer periphery of the arbor that engage recesses formed in the inner periphery of the mounting hole of the circular sawblade. The projections are usually rounded or convex male drive pieces spaced intermittently and circumferentially around the arbor periphery, although the projections can also be in the form of generally truncated cone shaped projections. The recesses in the arbor are correspondingly configured to receive the projections.

Typically, the sawblade is mounted onto the arbor endwise. The sawblade slides over the arbor until the desired operating position on the arbor is reached. Under operating conditions, the sawblade is maintained in its desired position with sawguides which prevent undesirable movement of the sawblade. This keeps the kerf or cutting width created by the blade narrow which is desirable in order not to avoid wood wastage during the sawing operation.

Arbors and sawblades which employ projections and recesses configured in the aforementioned conventional manner suffer from a variety of disadvantages and drawbacks. In one respect, the shape of the interfitting projections on the arbor and the corresponding recesses in the sawblade produces interface forces acting on the sawblade that have a radial component directed outwardly. This outwardly directed component of the interface force, which functions as an outward pushing force at the blade/arbor interface, is quite disadvantageous as it can cause a variety of problems. In one respect, the pushing force tends to enlarge or deform the mounting hole or eye in the circular sawblade over time as the sawblade is used. The deformation or expansion of the eye in the sawblade contributes to the reduction in tension in the sawblade which then requires that the sawblade be repeatedly re-tensioned.

The deformation or enlargement of the sawblade eye also leads to the loss of geometrical conformity of the sawblade to the arbor. As a result, blade centering is detrimentally affected. When the blade is not centered on the arbor, the teeth farthest away from the rotational axis of the arbor perform the greatest part of the cutting operation, that is they take the deepest cuts on the wood being cut. If this out of center condition is particularly excessive, for a given rotational speed of the sawblade and a given feed rate of the wood, some teeth may perform virtually no cutting. The out of center condition of the sawblade and the resulting difference in cutting action of the various teeth on the sawblade causes non-uniform heating of the sawblade, thus leading to undesirable distortion of the sawblade. Thus distortion is disadvantageous in that it negatively impacts the cutting efficiency of the sawblade as well as cutting deviation.

When the sawblade eye does not properly conform to the arbor, the sawblade is able to shift radially as it rotates and this causes eccentricity. As the eccentricity increases, undesirable imbalance forces are introduced and these imbalance forces impart undesirable forces to the blade. Since the imbalance force is represented by the eccentricity times the mass times the square of the rotational speed of the circular sawblade, increases in the eccentricity necessarily causes an increase in imbalance which imparts undesirable forces to the circular sawblade.

The enlargement of the eye in the sawblade that results from the pushing force at the sawblade/arbor interface in conventionally configured sawblade driven surfaces and arbor drive surfaces is also undesirable as the points of contact between the sawblade and the arbor change over time and on occasion become non-uniformly distributed. This can lead to blade flutter during cutting and a loss of stability. In addition, the radially outwardly directed component of force causes the sawblade to bend and kink during operation. This is disadvantageous at least from the standpoint of wear with respect to the sawguides. The sawguides which are positioned on opposite sides of the sawblade are designed to direct fluid at the blade from opposite sides of the blade so that the blade hydroplanes. If the sawblade is able to kink or bend on the arbor, the sawguides on either side of the circular sawblade wear more quickly and thus must be resized rather regularly.

Conventional configurations of the arbor and sawblade also present problems from the standpoint of safety, tolerances and sawblade driving efficiency. From a safety standpoint, there has arisen the unfortunate practice of "tree spiking" by those protective be felled. This practice involves driving large nails or spikes into the trunks of trees before cutting. Often the spikes are not readily observed by either the fellers or the sawmill operators with the result that during sawmill operations, the sawblade may strike a spike within the cant or log during the cutting operation. This can be quite dangerous since the sawblade can tear or fragment, whereupon pieces of shrapnel are distributed at high energy levels throughout the area where the cutting is taking place. This disintegration takes place because there is no retention of the sawblade by the spline when the sawblade splits or tears after contact with the spike.

From the standpoint of operating tolerances, the convex type engaging surfaces on the arbor result in a series of point contacts between the interfitting surfaces of the arbor and the circular sawblade. This point contact results in a series of high stress points between the arbor and the sawblade which increases wear on both members and reduces the driving efficiency between the arbor and the sawblade.

Yet a further disadvantage is that the arbor has to be hardened to a hardness greater than that of the sawblade. This practice is time consuming and expensive.

One type of sawblade and arbor system used for cutting wood involves what is referred to as a collared sawblade. In these types of systems, the sawblades are mounted on sawblade collars (virtually steel plates) which in turn are mounted on the arbor. U.S. Pat. No. 3,703,915 discloses such a system. This patent describes a thin kerf saw machinery that includes an arbor, and collar mounted sawblades. The sawblades are operably mounted to the collars, and the collars in turn interface with the arbor through a set of keys and keyways. The keys and keyways interface with the arbor in an attempt to provide vertical support to prevent the sawblade from tilting and to maintain the blade in a direction perpendicular to the arbor. This patent suggests that the tolerances between the keyways and the support key arms are sufficient to allow lateral movement.

It has been found that such a system suffers from a variety of drawbacks and disadvantages. In practice, it has been found that collared sawblades cannot operate at the same high speeds as non-collared arbor driven blades. This is because the collars create a rigid boundary at the sides of the sawblade around the eye of the sawblade. Also, gaps exists between the blade and the collar. During a cutting operation, lateral side forces are inevitably transmitted to the sawblade and these lateral forces tend to cause the blade to flex. During flexing of the blade under side loading or during the subsequent restoration, the blade can impact the collar and rebound away from it. At sufficiently high speeds, this process or sequence of flexing and restoration can be aggravated by the blade-guide impact and rebounding. This can lead to sawblade instability and subsequent equipment damage.

Another disadvantage associated with the system disclosed in the aforementioned patent relates to the use of elongated key support arms. As noted, the key support arm and the collars are intended to maintain the blade perpendicular to the arbor. In practice, it has been found that significantly better operational performance of the sawblade can be obtained by allowing the blade to free float on the arbor and to adjust to the woodgrain pattern during cutting. This allows the sawblade to slightly tilt, and move back and forth (i.e., float) during cutting. In contrast, the presence of the elongated key support arms in the above-described system prevents the slight tilting of the sawblade. Instead, under lateral loading, the sawblade tends to flex out of its plane. Additionally, when subjected to side forces, by virtue of the elongated keys, the entire blade/collar system is not able to move along the arbor, or shift slightly back and forth, because the tight tolerances in the lever action at the ends of the elongated keys cause them to pinch the arbor. This can lead to undesirable jamming of the sawblade.

SUMMARY OF THE INVENTION

In light of the foregoing, a need exists for a sawblade and arbor arrangement that is designed to avoid pushing or radially outwardly directed forces at the sawblade/arbor interface.

A need also exists for a sawblade and an arbor that are designed to minimize wear on the saw guides during operation of the sawblade.

It would also be desirable to provide a sawblade and an arbor that are designed to maximize sawblade driving efficiency while minimizing safety concerns and improving operating tolerances.

It would also be desirable to provide a sawblade which is self centering on the arbor while also being capable of maintaining large clearances along the outer periphery of the arbor that are necessary for efficient shifting of the blades during operation.

According to the present invention, a sawing mechanism for sawing wood includes an arbor and a circular sawblade. The arbor has a central axis and an outer diameter, and is provided with a plurality of outer drive surfaces circumferentially disposed in spaced apart relation along the outer peripheral surface of the arbor. The sawblade is provided with a centrally located mounting hole which receives the arbor so that the sawblade is mounted on the arbor. The centrally located mounting hole in the sawblade is bounded by a plurality of inner driven surfaces circumferentially spaced about the mounting hole for operatively engaging the outer drive surfaces on the arbor when the arbor is rotatably driven so that rotation of the arbor results in rotation of the sawblade in a rotational direction. The mounting hole in the sawblade has an inner diameter that is greater than the outer diameter of the arbor so that during a cutting operation the outer peripheral surface of the arbor is spaced from the inner peripheral surface of the mounting hole in the sawblade. The sawblade and the arbor are designed so that the radial component of the interface force from the arbor acting on the sawblade is directed inwardly, thereby permitting realization of a variety of advantages.

Another aspect of the present invention involves a sawblade of circular configuration for being mounted on an arbor to effect cutting through rotation of the sawblade in a rotational direction about a rotational axis. The sawblade has an outer cutting edge and a center opening for receiving the arbor. The center opening in the sawblade is bounded by a plurality of inner driven surfaces circumferentially spaced about the central opening for operatively interfacing with drive surfaces on the arbor so that rotation of the arbor results in rotation of the sawblade. Each of the inner driven surfaces extends between a first point and a second point, with the second point being located radially outwardly of the first point. Each of the inner driven surfaces is configured so that a second radial extending from the axis of rotation and through the second point is positioned forwardly with respect to the rotational direction of a first radial extending from the axis of rotation and through the first point. In addition, each of the inner driven surfaces is advantageously oriented at an angle of at least 55° with respect to the tangent to the circle concentric to the sawblade and passing through a point on the inner driven surface located halfway between the first and the second points.

Another aspect of the invention relates to a sawblade arbor for engaging a sawblade to rotatably drive the sawblade in a rotational direction about a rotational axis to effect cutting by the sawblade. The sawblade arbor has an outer peripheral surface provided with a plurality of drive surfaces engageable with driven surfaces on the sawblade to impart rotational movement to the sawblade during rotation of the arbor. Each of the drive surfaces extends between a first point and a second point, with the second point being located radially outwardly of the first point. The inner drive surfaces are configured so that a second radial extending through the second point is positioned forwardly with respect to the rotational direction of a first radial extending through the first point. Each of the drive surfaces is advantageously oriented at an angle of at least 55° with respect to the tangent of the sawblade arbor.

BRIEF DESCRIPTION OF THE DRAWING FIGURES

Preferred embodiments of the present invention will now be described, by way of example only, with reference to the accompanying drawing figures in which like elements are designated by like reference numerals and wherein.

DETAILED DESCRIPTION OF THE INVENTION

Figure 1:
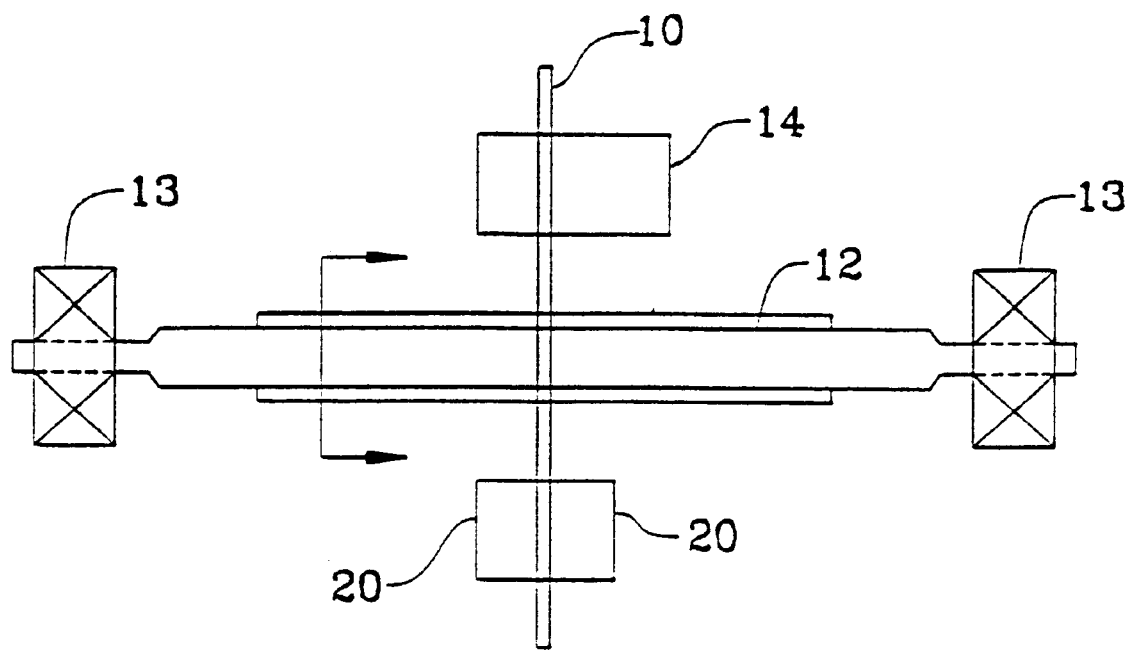
FIG. 1 is a side diagrammatic view of a circular sawblade cutting system in which the circular sawblade is mounted on an arbor between oppositely positioned saw guides.

Referring initially to FIG. 1, a circular sawblade 10 is mounted on an arbor 12. The arbor 12 is journalled in bearings 13 and a source of turning power is operatively connected to the arbor 12. The driving power supplied by the driving source rotates the arbor 12 and the rotation of the arbor 12 results in rotation of the sawblade 10 to thereby effect cutting of the wood 14 which is diagrammatically illustrated in FIG. 1. A pair of sawguides 20 is also provided, one of which is mounted on one side of the circular sawblade 10 and the other of which is mounted on the opposite side of the sawblade 10. These sawguides 20 guide the sawblade 10 and are typically designed to direct fluid at opposite sides of the sawblade 10. The sawguides 20 are movable axially on the arbor 12. It will be appreciated, of course, that a plurality of sawblades could be mounted on the arbor depending on the lumber which is being cut and the desires of the operator.

Figure 2:
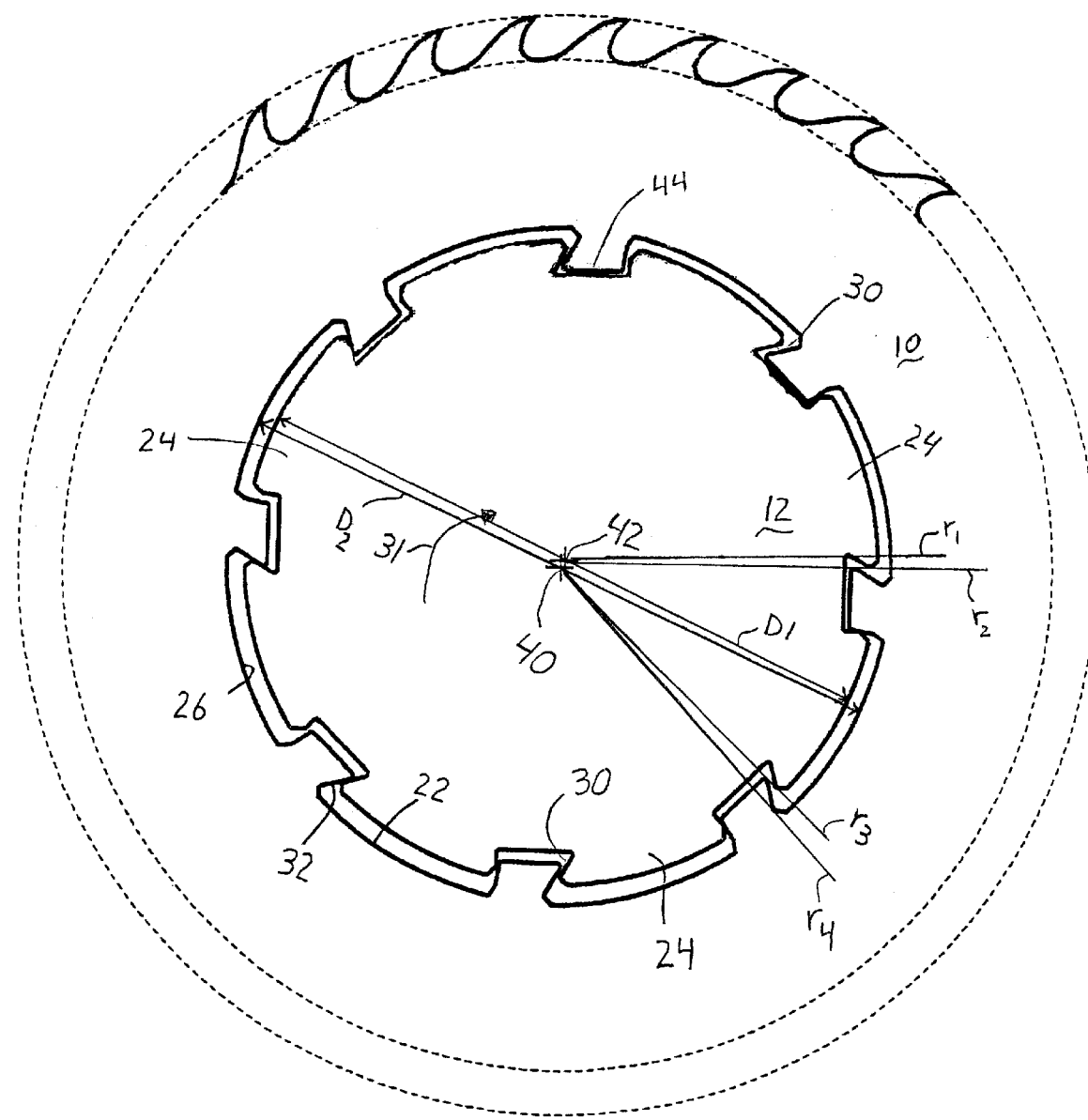
FIG. 2 is a side view of the circular sawblade mounted on an arbor in the non-operational state and illustrating the configuration and relationship of the drive surfaces on the arbor and the driven surfaces on the circular sawblade.

FIG. 2 illustrates the sawblade 10 mounted on the arbor 12. The sawblades used in the present invention constitute non-collared arbor driven sawblades. In the illustrated embodiment, the sawblade 10 and the arbor are adapted to be driven during operation in the clockwise direction represented by the arrows. The circular sawblade 10 is a one-piece sawblade and is provided with a centrally located mounting hole or eye 22 that receives the arbor 12 so that the circular sawblade 10 is mounted on the arbor 12. The arbor 12 is provided with a plurality of sawblade engaging projections 24 that are circumferentially spaced about the outer periphery of the arbor 12. The sawblade engaging projections 24 are received in recesses 26 formed at circumferentially spaced locations on the inner periphery of the mounting hole 22 of the sawblade 10. Thus, the mounting hole 22 of the sawblade 10 is bounded by the recesses 26.

It is to be noted that removable inserts made of hardened steel material can be positioned along the forward leading edge or face of each of the sawblade engaging projections 24. The inserts can be secured in place in any desired manner such as through the use of bolts.

The forward leading face or edge of each of the sawblade engaging projections 24 defines an outer drive surface 30 of the arbor 12. Thus, the outer periphery of the arbor 12 is provided with a plurality of circumferentially spaced apart drive surfaces 30. Each of the outer drive surfaces 30 is configured and oriented so that they extend between a first point and a second point, with the second point being located radially outwardly of the first point. The first point (depicted in FIG. 2 as the point through which passes the radial $r_1$) represents the radially inwardmost point on each drive surface 30 while the second point (depicted in FIG. 2 as the point through which passes the radial $r_2$) represents the radially outermost point on the linear or planar portion of each drive surface 30. The radials $r_1$, $R_2$ extend from the center 42 of the arbor 12. Each drive surface 30 is further configured and arranged so that the radial $r_2$ passing through the second point of each drive surface is located forwardly of the first point as considered with reference to the rotational direction of the arbor and sawblade.

The recesses 26 formed in the inner peripheral surface of the mounting hole 22 of the sawblade 10 are each provided with an inner driven surface 32 that faces the respective drive surface 30 on the arbor 12. The mounting hole 22 in the sawblade 10 is thus bounded in part by the circumferentially spaced apart inner driven surface 32. Each of the inner driven surfaces 32 on the sawblade 10 is adapted to be engaged by the respective facing drive surface 30 on the arbor 12 so that rotational movement of the arbor 12 is transferred to the sawblade 10.

Each of the inner driven surfaces 32 is configured and oriented so that they extend between a first point and a second point, with the second point being located radially outwardly of the first point. The first point (depicted in FIG. 2 as the point through which passes the radial $r_3$) represents the radially inwardmost point on linear portion of each inner driven surface 32 while the second point (depicted in FIG. 2 as the point through which passes the radial $r_4$) represents the radially outermost point on the linear or planar portion of each inner driven surface 32. The radials $r_3$, $r_4$ extend from the center 40 of the sawblade 10. Each inner driven surface 32 on the sawblade 10 is further configured and arranged so that the radial $r_4$ passing through the second point of each driven surface 32 is located forwardly of the radial $r_3$ passing through the first point as considered with reference to the rotational direction of the arbor and sawblade. The rotational direction of the arbor and sawblade are represented by the arrow 31 in FIGS. 2 and 3.

As further seen with reference to FIG. 2, the outer diameter $D_1$ of the arbor 12 is less than the inner diameter $D_2$ of the sawblade 10. This difference in diameters is greater than a difference in diameters that would exist in the case of a tight fit of the sawblade 10 on the arbor 12.

FIG. 2 illustrates the sawblade 10 mounted on the arbor in a non-operational position, that is when the sawblade in not rotating but is simply at a position of rest. As can be seen, by virtue of the outer diameter $D_1$ of the arbor 12 being less than the inner diameter $D_2$ of the sawblade 10, when the sawblade is non-operational and at rest, the center 40 of the sawblade 10 is spaced from and not coincident with the center 42 of the arbor 12. At this position, the sawblade 10 rests on the arbor 12 along a region 44 positioned at the top of the arbor 12. Thus, the center 40 of the sawblade 10 is positioned below the center 42 of the arbor 12.

The configuration and orientation of the drive surfaces 30 on the arbor 12 and the driven surfaces 32 on the sawblade 10, in combination with the difference in diameter of the outer periphery of the arbor 12 relative to the inner periphery of the mounting hole in the sawblade 10, are specifically designed to provide a self-centering function for the sawblade. That is, during operation of the sawblade and arbor, when the sawblade 10 is subjected to torque, such as occurs due to fluid resistance in the guides and also when the sawblade engages a piece of wood being cut, the force applied to the sawblade 10 causes the sawblade 10 to move rotationally relative to the arbor 12. As the sawblade 10 moves rotationally relative to the arbor 12, the driven surfaces 32 on the sawblade 10 contact or engage the drive surfaces 30 on the arbor 12. By virtue of the configuration, orientation and arrangement of the drive surfaces 30 and the driven surfaces 32, and the continued application of the torque force to the sawblade, the contact or engagement between the driven surfaces 32 on the sawblade 10 and the drive surfaces 30 on the arbor 12 causes the sawblade 10 to shift radially relative to the arbor 12 until the center 40 of the sawblade 10 becomes coincident with the center 42 of the arbor 12. When the driven surfaces 32 on the sawblade 10 and the drive surfaces 30 on the arbor 12 are caused to engage one another, the sawblade 10 is forced to shift its position from that shown in FIG. 2 to that shown in FIG. 3. This shifting of the radial position of the sawblade 10 relative to the arbor 12, and the resultant self-centering of the sawblade relative to the arbor that occurs is a result of the spacing that is provided between the arbor and the sawblade as well as the way in which the drive surfaces 30 on the arbor 12 and the driven surfaces 32 on the sawblade 10 are configured, arranged and oriented. When the sawblade 10 shifts radially to the centered position with respect to the arbor 12 as the drive surfaces 30 on the arbor 12 engage the driven surfaces 32 on the sawblade 10, the drive surfaces 30 on the arbor 12 and the driven surfaces 32 on the sawblade 10 are parallel or substantially parallel to one another as seen in FIG. 3.

Figure 3:
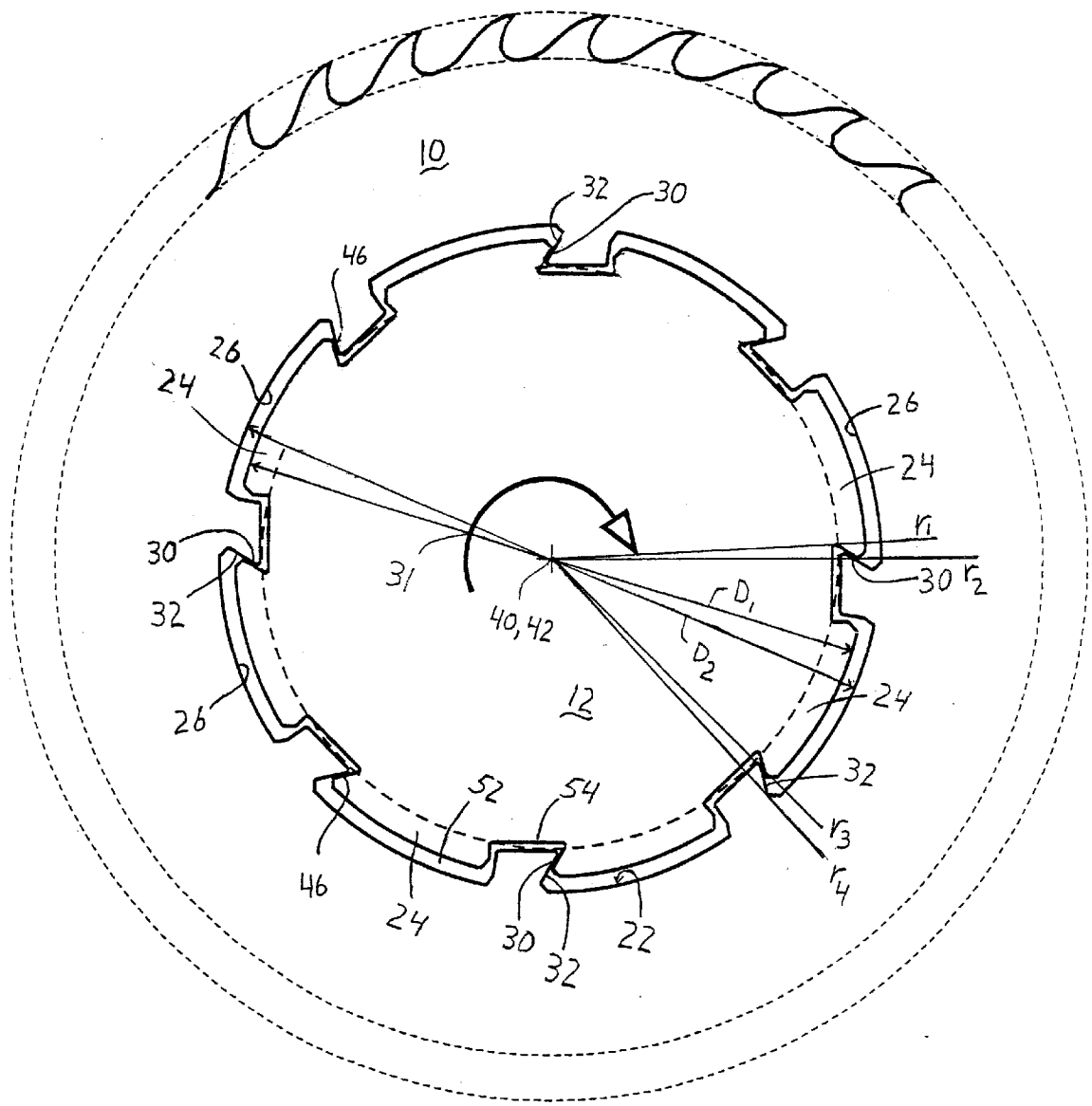
FIG. 3 is a side view of the circular sawblade mounted on an arbor in the operational state and illustrating the configuration and relationship of the drive surfaces on the arbor and the driven surfaces on the circular sawblade.

FIG. 3 illustrates the position of the sawblade 10 relative to the arbor during operation when the sawblade is subjected to a torque force. As can be seen, the center 40 of the sawblade 10 is located coincident with the center 42 of the arbor 12. In addition, the contact between the sawblade 10 and the arbor 12 shifts from the point or region 44 shown in FIG. 2. That is, when the sawblade 10 is in the operational state, contact between the sawblade 10 and the arbor 12 occurs substantially only in the regions 46 defined by the engaging areas of the drive surfaces 30 of the arbor 12 and the driven surfaces 32 of the sawblade 10. This contact occurs along a plane. In addition, with the center of the sawblade positioned in coincidence with the center of the arbor, a space or clearance exists between substantially the entire outer periphery of the arbor 12 and substantially the entire inner periphery of the mounting hole in the sawblade 10.

The configuration, orientation and arrangement of the drive surfaces 30 on the arbor 12 and the driven surfaces 32 on the sawblade 10, combined with the difference in diameter of the outer periphery of the arbor 12 relative to the inner periphery of the mounting hole in the sawblade 10, and the self-centering function provided by such arrangement are advantageous in a variety of respects. In one significant respect, the engagement between the drive surfaces 30 and the driven surfaces 32 in accordance with the present invention results in so-called pulling forces. Pulling forces are defined as the radial components of the sawblade/arbor interface forces that are applied on the driven surfaces of the sawblade by the arbor. These radial components of the sawblade/arbor interface forces applied on the driven surfaces of the sawblade by the arbor are directed radially inwardly towards the center of the sawblade.

Figure 4:
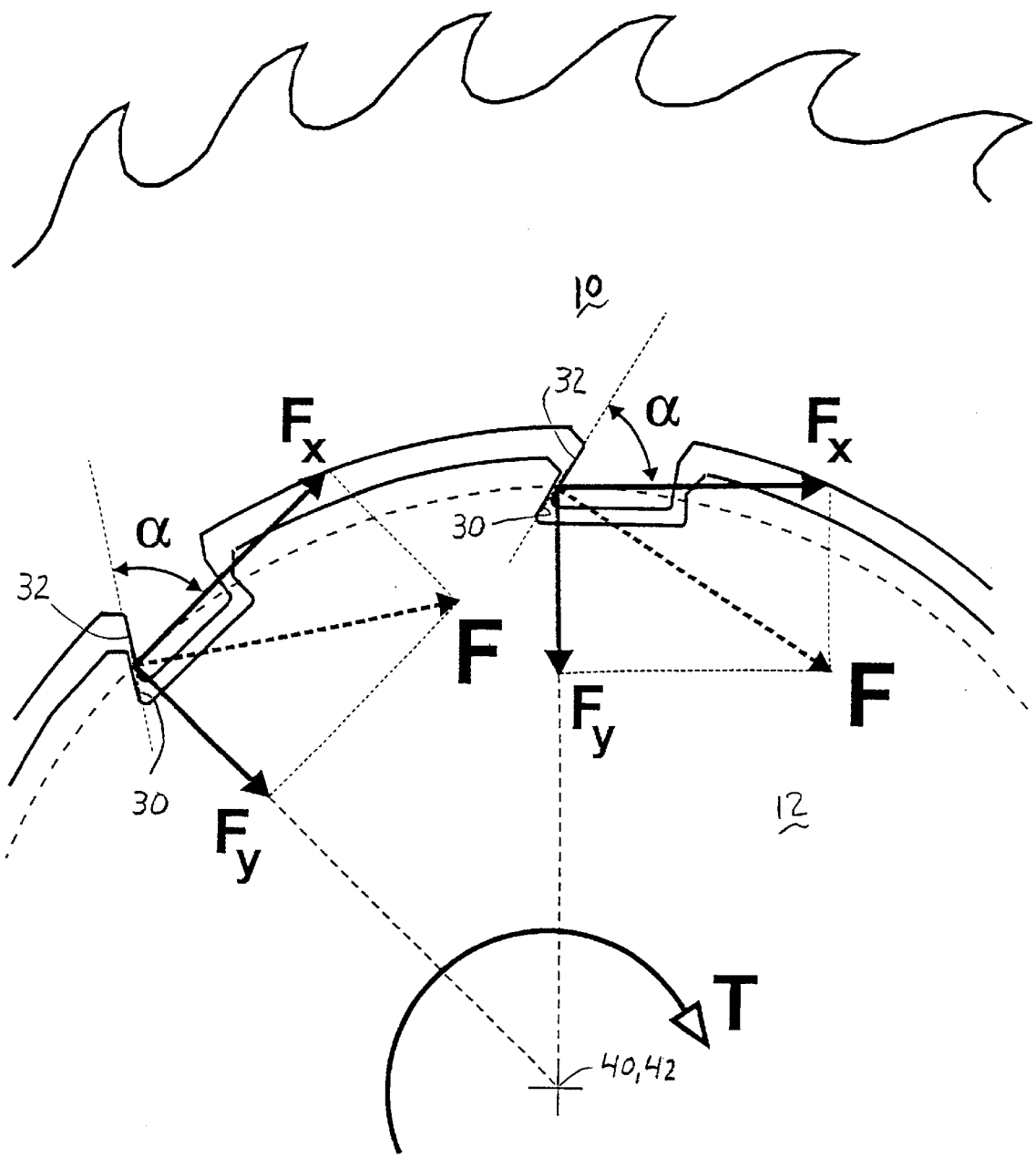
FIG. 4 is an enlarged side view of a portion of the sawblade and arbor shown in FIGS. 2 and 3 illustrating the interface force acting on the blade and components thereof that exist at the drive surface/driven surface interfaces.

This difference can be at least partially understood by considering the forces imparted by the drive surfaces 30 of the arbor 12 to the driven surfaces 32 of the sawblade 10 during operation of the sawblade. With reference to FIG. 4, the interface force F that is applied to the sawblade is normal or perpendicular to the sawblade/arbor interface. This force results from the torque T applied to the arbor which is represented by the arrow in FIG. 4. The angle $\alpha$ defines the angular orientation of the sawblade/arbor interface (or the angular orientation of the driven and drive surfaces) in the engaged condition with respect to the tangent passing through the point at which the interface force F is applied. The angle $\alpha$ is measured from the line or plane of the sawblade/arbor interface to the tangent and in the direction of rotation of the arbor and sawblade. The interface force F can be divided into a tangential component $F_x$ along the tangent which is in the direction of the torque applied to the arbor and which is thus responsible for driving the sawblade, and a radial component $F_y$ directed along the radial. The tangential component $F_x$ acts along the tangent to a circle concentric with the sawblade and arbor (when in the engaged condition) and passing through a point on the interface between the inner driven surface 32 and the outer drive surface 30. When the angle $\alpha$ is less than 90°, the radial component $F_y$ of the interface force F is directed inwardly and constitutes a pulling force.

Figure 5:
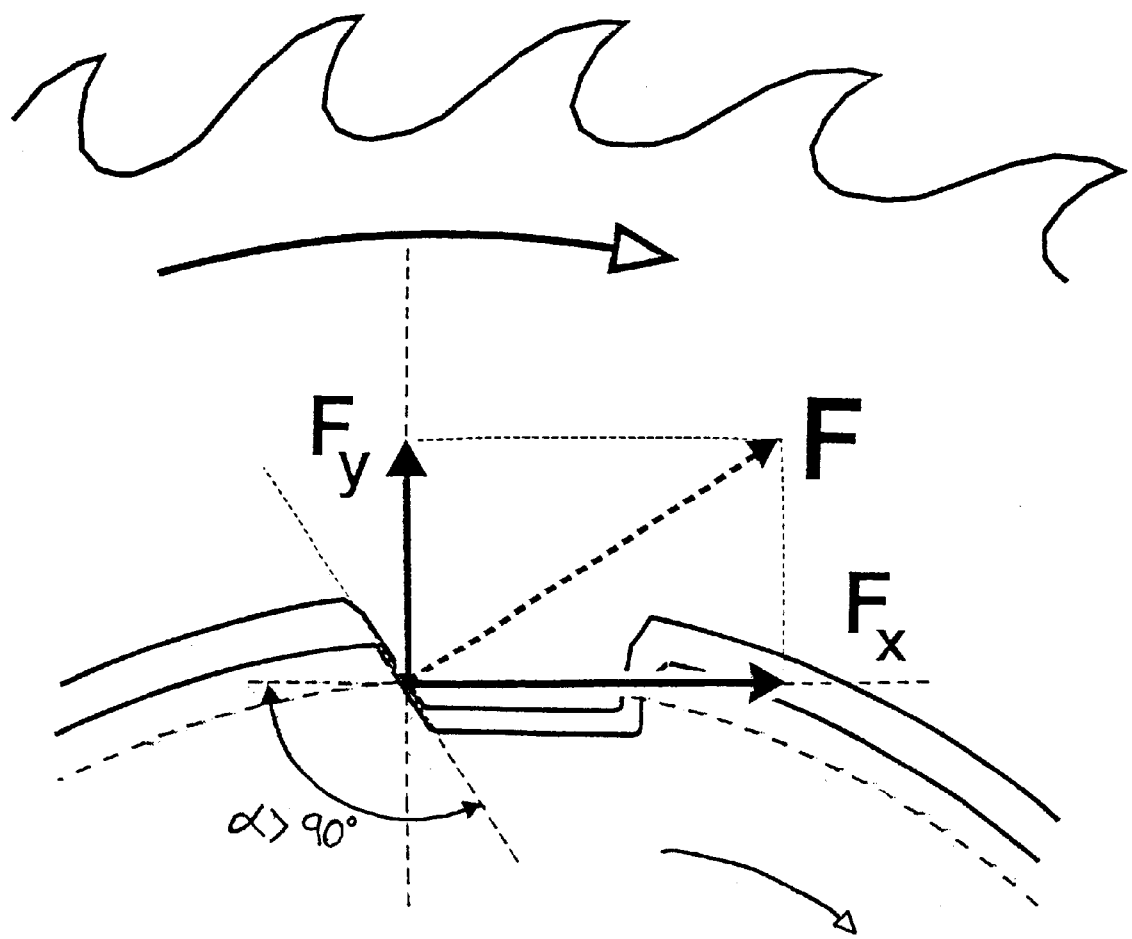
FIG. 5 is an enlarged side view of a portion of a sawblade and arbor illustrating the pushing forces that arise at the driven surface/drive surface interface with differently configured drive surfaces and driven surfaces.

FIG. 5 which depicts a portion of a sawblade and arbor similar to that shown in FIG. 4 except that the configuration of the engaging portions of the sawblade and arbor is similar to that associated with conventional sawblades and arbors where the angle $\alpha$ is greater than 90°. In this situation, the radial component $F_y$ of the interface force F is directed outwardly, thus producing a pushing force as described above in connection with conventional sawblades and arbors. If the angle $\alpha$ is equal to 90°, the radial component of the interface force F is absent so that neither a pulling force nor a pushing force is produced.

Configuring the sawblade 10 and the arbor 12 so that pulling forces are achieved as the sawblade 10 is driven advantageously serves to not only allow the sawblade 10 to automatically self center itself on the arbor, but also helps stabilize the sawblade 10 during cutting operations. In addition, pulling forces maintain the integrity of the eye 22 of the sawblade 10. That is, since the radial force component $F_y$ of the interface force F is directed radially inwardly, rather than radially outwardly, an enlarging force is not applied to the mounting hole 22 of the sawblade 10. This is significant because it means that the eye or the mounting hole 22 in the circular sawblade 10 is not continually enlarged as is the case with other known sawblade/arbor arrangements. Thus, the problems associated with a continually enlarging mounting hole in the sawblade do not arise.

The presence of pulling forces also improves the so-called tension in the sawblade 10. That is because the eye 22 of the sawblade is not continually enlarged during use. Maintaining the integrity of the eye 22 of the sawblade 10 in this manner preserves and in fact improves the original tension in the sawblade. This is financially beneficial in that the frequency with which sawblade maintenance is required, that is removal from the machine and re-tensioning, is significantly reduced.

Proper tensioning of the sawblade is quite important from the standpoint of achieving operational stability of the sawblade which is necessary for efficient cutting of the wood. Additionally, by designing the sawblade in a manner that promotes stability of the sawblade, it is possible to use thinner sawblades. This reduces the amount of waste produced during the cutting operation. Consequently, improved yield can be achieved, thereby adding to the profitability of the operation. It has been found that through implementation of the present invention, it is possible to reduce the plate thickness of the sawblade from 0.100 inches to 0.070 inches on a seventeen inch sawblade while maintaining stable blade operation and improved sawblade deviation.

As noted above, the configuration of the sawblade/arbor interface in accordance with the present invention also improves and preserver the automatic centering of the sawblade on the arbor. In conventional sawblade/arbor configurations which produce pushing forces at the sawblade/arbor interface, the eye of the sawblade is gradually enlarged, thereby leading to loss of geometrical conformity of the sawblade to the arbor. Thus, the ability of the sawblade to achieve automatic self centering on the arbor deteriorates over time. In contrast, the pulling forces associated with the sawblade/arbor configuration of the present invention do not cause enlargement of the eye 22 of the sawblade 10 and so the geometrical conformity of the sawblade to the arbor is maintained, thus preserving the sawblade's ability to achieve accurate self-centering. By virtue of its ability to maintain this self centering characteristic over time, the sawblade's ability to carry out efficient cutting of the wood is not detrimentally affected. That is because when the sawblade is maintained in a centered position during the cutting operation, all of the teeth on the sawblade 10 cut with equal or substantially equal depths of cut. This prevents localized heating of the sawblade 10 so that sawblade distortion associated with such localized heating does not occur.

The presence of the pulling forces associated with the sawblade/arbor configuration of the present invention is also advantageous in that it allows for much larger clearances between the sawblade 10 and the arbor 12. The ability to employ larger clearances is particularly useful in applications where in-operation sawblade shifting occurs, such as in the case of shifting edgers. Increased sawblade/arbor clearances also reduce the chances of sawblade jamming on the arbor and allows for smoother shifting of the sawblade.

It has also been found that the particular angle a is quite important in the design of the sawblade/arbor interface. With reference to FIG. 4, it can be seen that variations in the angle $\alpha$ cause the radial force component $F_y$ to also change since the tangential force component $F_x$ must remain unchanged as it provides certain required torque and since $F_y = F_x/\tan\alpha$. Since the magnitude of the sawblade/arbor interface force F depends upon the two components $F_y$, $F_x$, the sawblade/arbor interface force F also varies with changes in the angle $\alpha$. It follows that as the angle $\alpha$ increases, the radial force component $F_y$ decreases and so does the sawblade/arbor interface force F, until such time as the radial force component $F_y$ becomes zero and the sawblade/arbor interface force F becomes equal to the tangential component $F_x$ when the angle $\alpha$ reaches 90°. Conversely, as the angle $\alpha$ decreases, the radial force component $F_y$ and the sawblade/arbor interface force F increase. When the angle $\alpha$ reaches zero, the radial force component $F_y$ and the sawblade/arbor interface force F approach infinity. Thus, by varying the angle $\alpha$, the amount of stabilized pulling can be varied. In addition, variations in the sawblade/arbor interface forces F result in corresponding variations of the stresses at the outermost points on the driven surfaces which are located on the protrusions or tabs of the sawblade. As the sawblade/arbor forces F increase, the stresses increase and vice-versa. It is clear, therefore, that the amount of desired stabilizing pulling associated with the radial force component $F_y$, must be weighed against the potential over-stress of the driven surfaces due to the sawblade/arbor interface forces F.

It has been found in this regard that for large blade sizes (for example 36 inch–48 inch) that are characterized by the presence of large operational torques and driven by relatively small arbors (for example 8 inches), a sufficient amount of pulling is achieved when the angle $\alpha$ is in the range of 70° to 80° while at the same time maintaining reasonably low stress levels along the driven surfaces. For smaller blades that are typically subjected to lower torques, the amount of pulling can be increased without over-stressing the driven surfaces. For systems employing the small blades, the angle $\alpha$ can be reduced to 60°. In some specialized cases where stabilizing pulling is of particular importance, the angle $\alpha$ can be reduced to 55°. However, it has been found that 55° is the lowest practical value for the angle $\alpha$ that can be employed. Angles lower than this 55° value result in potential wedging of the driven/drive surfaces which can worsen the in-operation shifting of the blades.

Thus, by designing the sawblade and arbor in accordance with the present invention, play between the drive surface/driven surface interface can be minimized during system operation (cutting or idling). Excessive play between the interfacing surfaces can adversely affect the performance of the sawblade/arbor system, can increase the cutting deviation, and can diminish the operational stability of the blade plate. In accordance with the present invention, minimization of the play between the drive surface/driven surface interface is achieved by the particular geometry of the interface where pulling forces are generated. In operation, these pulling forces cause the sawblade to conform to the geometry of the arbor and thus rotate concentrically with the arbor regardless of other forces acting on the blade such as those due to cutting or blade imbalance.

The present invention also ensures and maintains the sawblade/arbor operational concentricity. In this regard, the pulling forces achieved through the particular geometry of the drive surface/driven surface interface provides strong and sustained centering of the sawblade on the arbor. This increases the cutting efficiency and accuracy since substantially all teeth participate equally in the cutting process. This in turn increases the time of continuous blade operation as the teeth stay sharp for a longer period of time and also reduces the power consumption during cutting.

The present invention also enhances the operational stability of the blade and maintains the tension in the blade through elimination of detrimental pushing forces (i.e., radially outward components of the sawblade/arbor interface forces). This thus reduces the cutting deviation. By virtue of the present invention, continuous and sustained centering of the sawblade on the arbor can be realized, while at the same time allowing for the presence of substantial gaps between the sawblade and the arbor along the non-contact regions. This advantageously permits efficient and smooth shifting, and improves operational stability of the blade.

The present invention is further advantageous in that it reduces the wear on the saw guides. Since the operational stability of the sawblade is increased through use of the particular geometry of the drive surface/driven surface interface in accordance with the present invention, blade flutter is decreased. Thus, the chance of the sawblade coming into contact with the saw guides is reduced, thus significantly reducing the wear of the saw guides. Also, the improved shifting that is made possible by virtue of the present invention greatly contributes to a reduction in the wear of the saw guides.

The radially inwardly directed nature of the y component of the force applied by the drive surfaces to the driven surfaces is also desirable as such component of force does not tend to bend or warp the sawblade out of plane during operation. Indeed, it has been found that through use of the sawblade and arbor arrangement of the present invention, the wear area on the arbor is substantially the same width as the thickness of the blade and does not exceed the clearances in the guides, thus indicating that the sawblade of the present invention does not distort or bend in the same manner as other known types of sawblades.

A further advantage associated with the present invention relates to the sawguides that are positioned on either side of the circular sawblade. As noted above, the sawblade and arbor configuration in accordance with the present invention does not give rise to the same radially outwardly directed pushing component of force at the drive surface/driven surface interface, thus substantially eliminating a factor which would otherwise contribute to bending or warping of the sawblade. Since the sawblade is not subjected to this type of force which tends to bend the sawblade, the sawguides do not wear nearly as much. Thus, refinishing of the sawguides is required significantly less often than in other known types of sawblade systems. Indeed, it has been found that refinishing need only be performed about once a week or so in the context of the present invention. This is in contrast to other known types of arrangements in which the sawguides must be refinished every four hours or so.

The present invention also advantageously allows the sawblade to free float on the arbor and to adjust to the woodgrain pattern during cutting. During a cutting operation, the sawblade will slightly tilt and float back and forth along the arbor. This floating typically takes place within a rather small range (e.g., 0.01 inches). By virtue of this tilting and floating action, the sawblade is able to adjust to the woodgrain pattern while maintaining its planarity so that the plane of the sawblade is largely and mostly perpendicular to the axis of the arbor. This is advantageous as it has been found that it is better to avoid completely restraining lateral sawblade movement and preventing all tilting of the sawblade, particularly in high speed cutting processes. Thus, for efficient operation, the sawblade should be allowed a certain amount of free movement along the arbor, and the present invention permits such movement.

Figure 6:
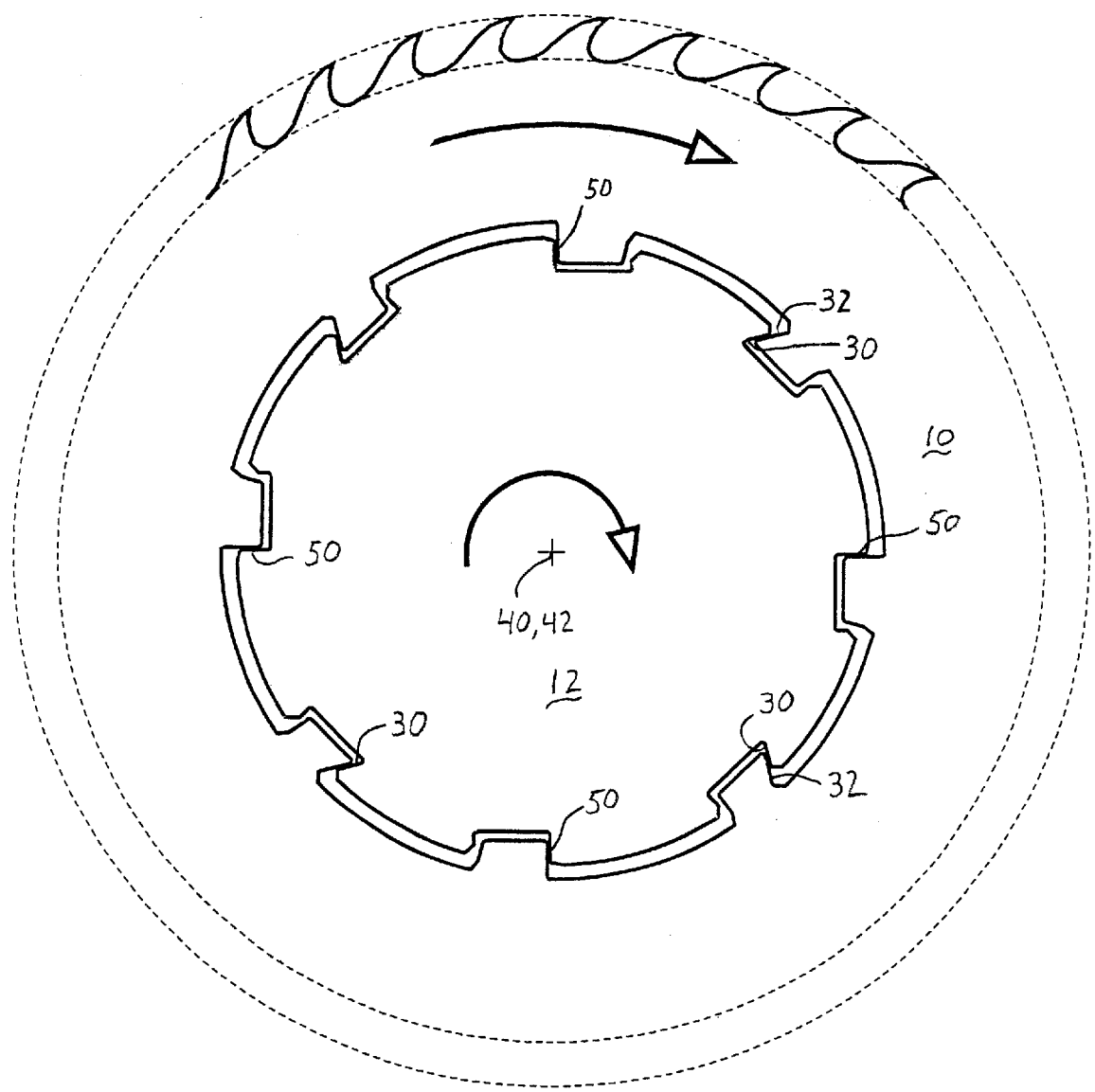
FIG. 6 is a side view similar to FIGS. 2 and 3 illustrating an alternative embodiment of the present invention.

FIG. 6 represents an alternative embodiment of the present invention that is similar to the embodiment described above and shown in FIGS. 2–4 except that the drive surface/driven surface interfaces are designed so that every second interface 50 is oriented at an angle α equal to 90°. At these surfaces, no pulling forces are present and the interface forces are strictly along the tangential directions. At the remaining interfaces, the advantageous pulling forces described above are present. It has been found that sawblade and arbor configurations such as that illustrated in FIG. 6 can still possess sufficient amount of pulling on the sawblade while at the same time being able to withstand much higher applied torques. This is because for the same amount of torque, the interface forces which counteract the torque and act along the tangential direction result in the lowest stresses in the inner blade protrusions without generating pushing forces in the sawblade. Such an embodiment might be particularly beneficial for large blade systems which do not require strong pulling action, but which at the same time are subjected to very high torques.

As described above, the outer diameter $D_1$ of the arbor 12 in both embodiments of the invention is less than the inner diameter $D_2$ of the mounting hole in the sawblade 10 so that a gap or space exists between the arbor outer periphery and the sawblade mounting hole inner periphery. With the central axis 40 of the sawblade 10 coincident with the central axis 42 of the arbor 12, this gap or space is preferably at least about 0.02 inches, and can be on the order of 0.03–0.05 inches. The sawblade and arbor can be designed so that a slightly greater gap or space exists at some areas relative to others. For example, as seen in FIG. 3, the sawblade and arbor can be configured so that the gap or spacing at regions 54 is smaller than the gap or spacing at regions 52. By way of example, the gap of regions 54 can be on the order of about 0.026 inches whereas the gap in the region 52 is on the order of about 0.041 inches.

Another aspect of the present invention relates to configuring the sawblade to relieve stress concentrations at the base of the driven surfaces of the sawblade. It has been found that for large sawblades running on relatively small arbors, the interface forces on the driven surfaces are quite high, particularly when the base of the driven surfaces define sharp corners. These high interface forces can cause significant levels of stress at the bases of the driven surfaces. Sharp corners possessing small radii of curvature at such locations can, through stress intensification, cause cracking and fatigue in the sawblade.

Figure 7:
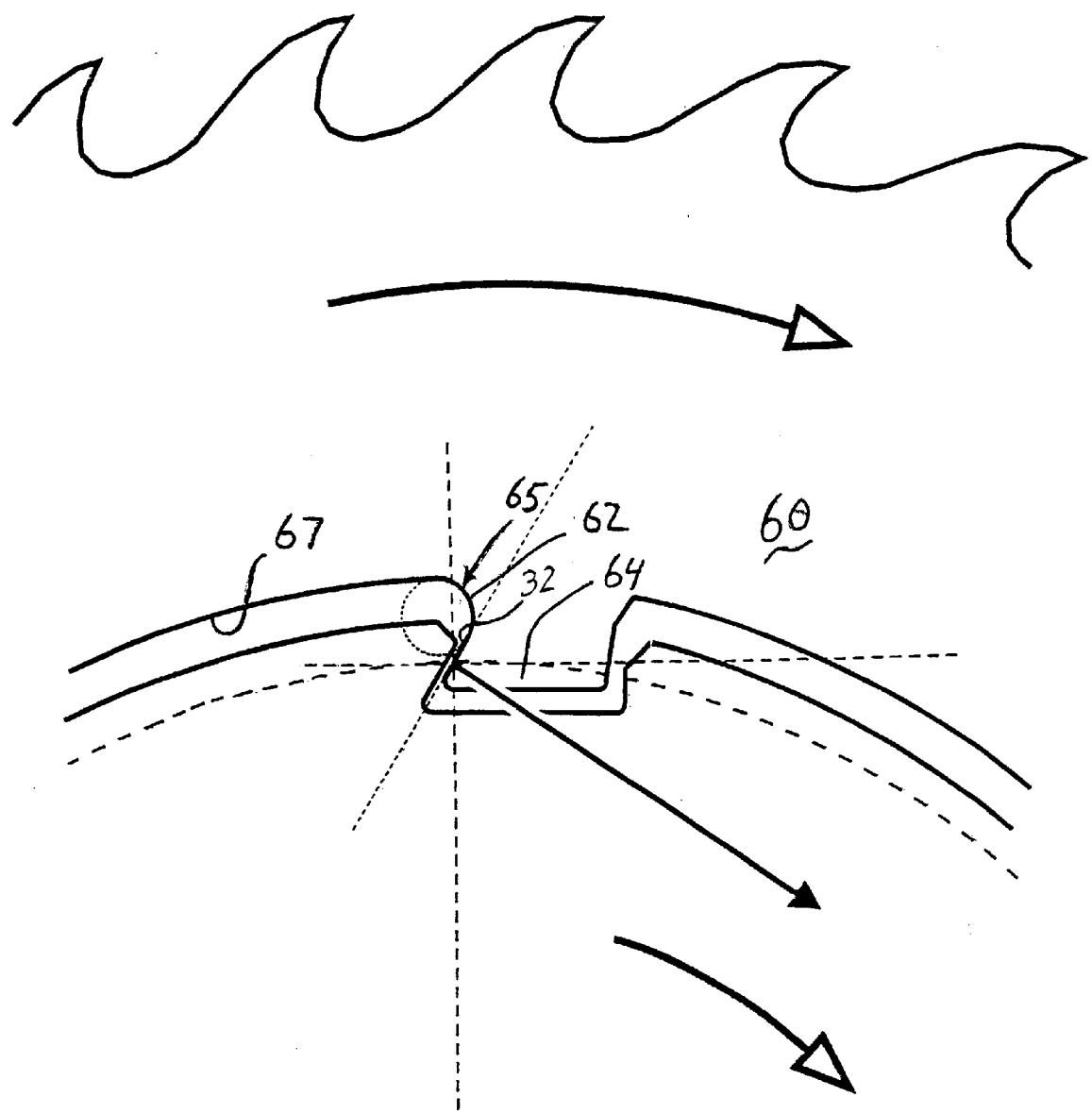
FIG. 7 is a side view of a portion of a sawblade and arbor arrangement illustrating another embodiment of the present invention.

In accordance with the present invention, the sawblade is configured to provide a mechanism designed to relieve these stress concentrations. As seen in FIG. 7, the sawblade 60 is provided with a larger radii stress relief curvature or cutout 65 at the base 62 of the driven surface 32 where the driven surface 32 or sawblade projection 64 joins the curved inner peripheral surface 67 of the body of the sawblade 60. A comparison of FIG. 7 to FIG. 3, for example, reveals the greatly increased radius of curvature at the curved stress relief cutout 65 shown in FIG. 7 as compared to the corresponding portion of the sawblade shown in FIG. 3. The larger radii stress relief curvature 65 shown in FIG. 7 is preferably provided at the base 62 of all of the driven surfaces 32.

Figure 8:
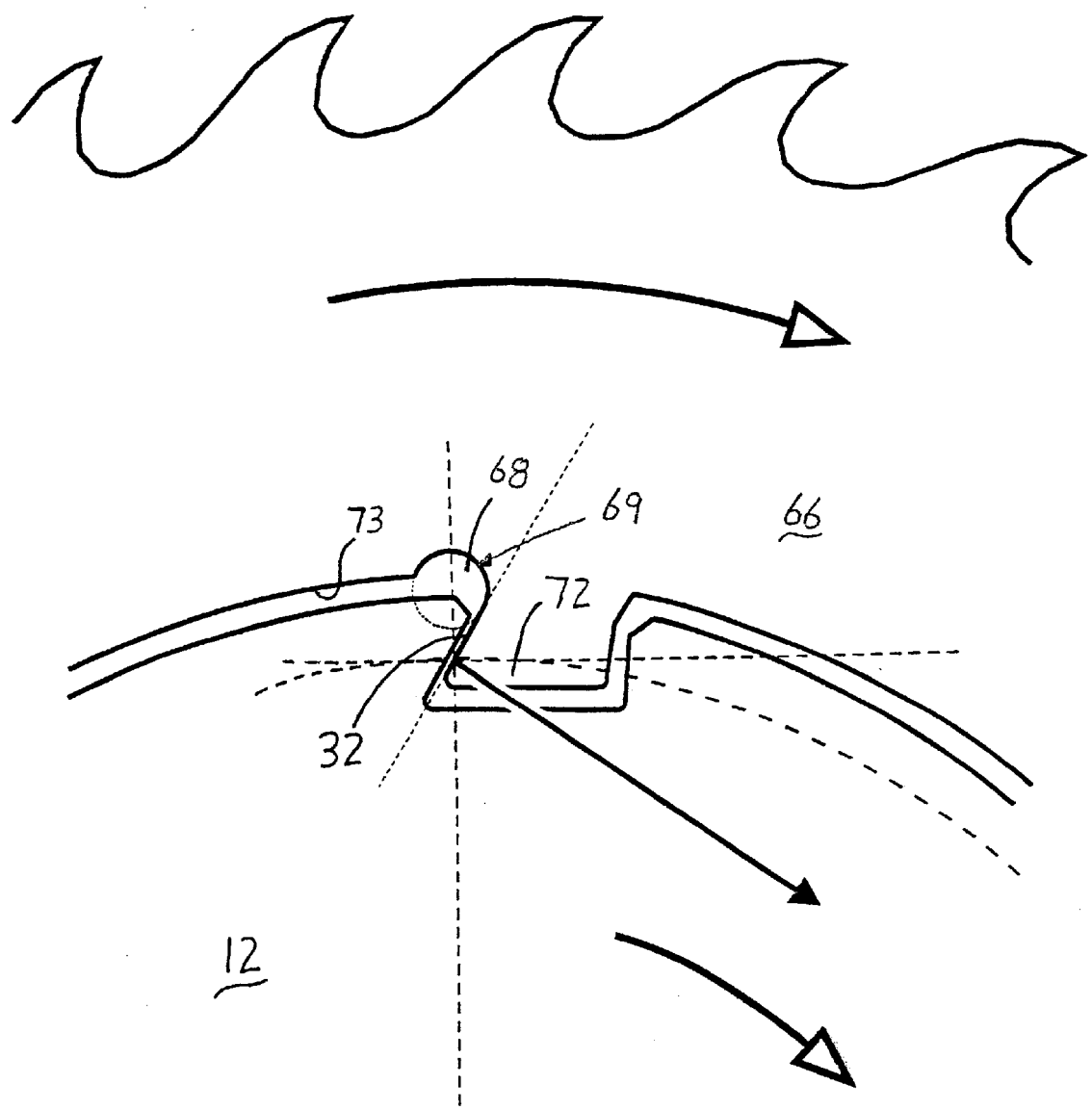
FIG. 8 is a side view of a sawblade and arbor arrangement similar to FIG. 7, but illustrating an alternative embodiment.
Figure 9:
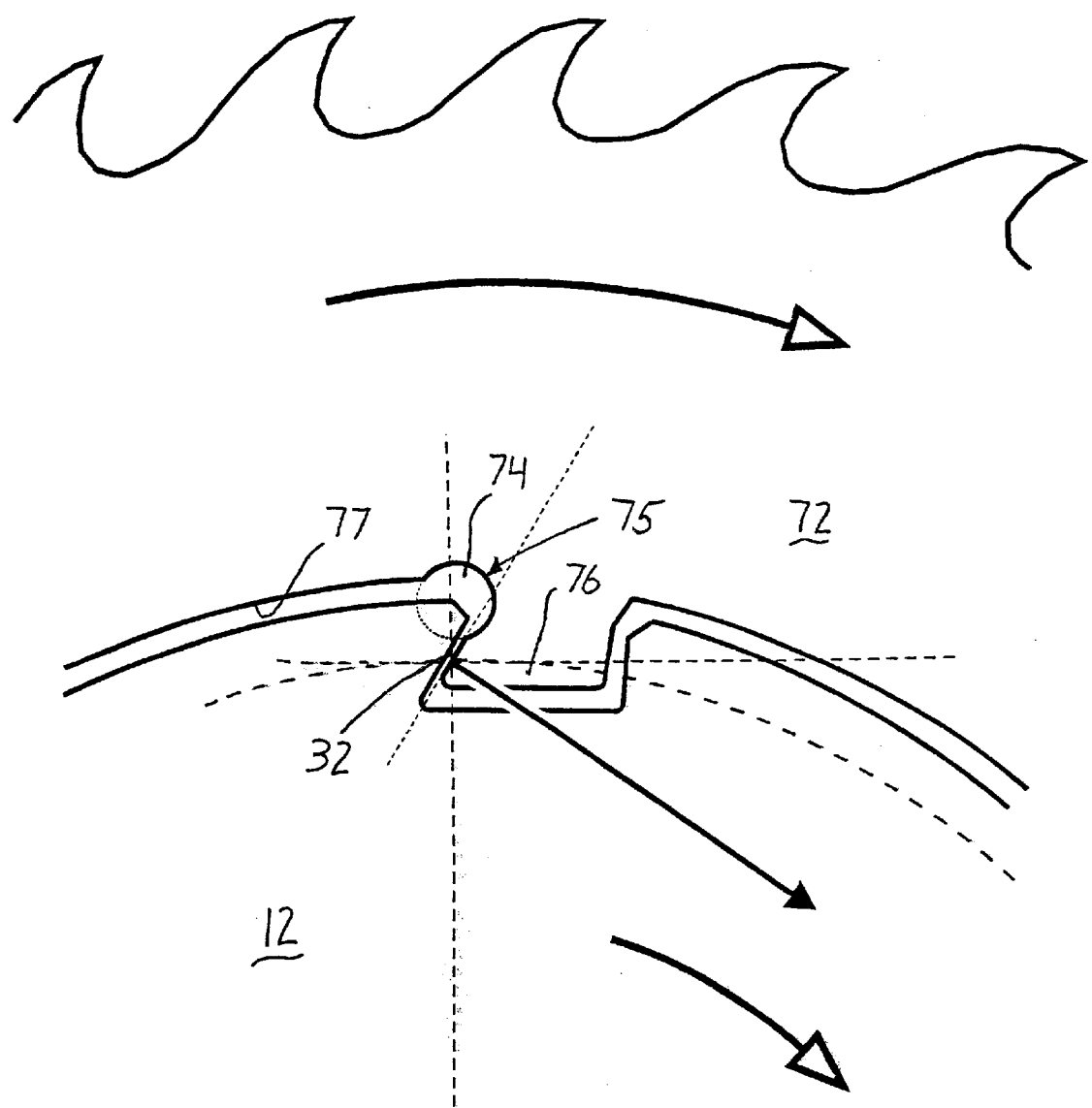
FIG. 9 is a side view of a sawblade and arbor arrangement similar to FIG. 7, but illustrating a further embodiment of the present invention.

In the event that the clearance gaps between the sawblade and the arbor do not allow for certain size radii of curvature without interfering with the drive faces on the arbor, the stress relief curvature or cutout 69, 75 can be extended into the sawblade past the outer diameter of the sawblade eye or inner periphery as seen in FIGS. 8 and 9. As can be seen with reference to FIG. 8, the sawblade 66 is designed so that the base 68 where the sawblade projections 72 or driven surfaces 32 join the inner periphery 73 of the sawblade are provided with a radius of curvature larger than that associated with the embodiment illustrated in FIG. 7. In the FIG. 8 embodiment, the cutout 69 actually extends beyond the imaginary continuation of the inner periphery 73 of the sawblade.

Further, as seen in FIG. 9, the sawblade 72 is designed so that the bases 74 are provided with an even greater radius in curvature relative to the embodiment shown in FIG. 8. The various embodiments illustrated in FIGS. 7–9 differ from one another in that if the required radius of curvature necessary for effecting the desired stress relief protrude too much into the blade radially, stress relief can be accommodated by shifting the opening tangentially, thus enabling them to be located closer to the axis of rotation.

As seen FIG. 9, stress concentration relieving configurations or cutouts 75 are located at the base 74 of the driven surfaces 32 where the sawblade projections 76 or driven surfaces 32 join the inner periphery 77 of the sawblade. These stress concentration relieving configurations or cutouts 75 shown in FIG. 9 extend not only beyond the imaginary continuation of the inner periphery 77 of the sawblade 72, but also extend into the driven surface 32 of the sawblade. As in the case of the FIG. 7 and FIG. 8 embodiments, the stress concentration relieving configurations or cutouts are preferably provided at the base of all of the driven surfaces of the sawblade.

The stress concentration relieving configurations or cutouts shown in FIGS. 7–9 can be employed in conjunction with the various other embodiments of the sawblade described above and illustrated in the earlier drawing figures.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A sawing apparatus, comprising:
    an arbor having a central axis and an outer diameter, the arbor possessing an outer peripheral surface, the arbor being rotatably driven about the central axis during operation of the sawing apparatus and being provided with a plurality of outer drive surfaces circumferentially disposed in spaced apart relation along the outer peripheral surface of the arbor;
    a one-piece sawblade of circular configuration having a central axis, the sawblade being provided with a centrally located mounting hole which receives the arbor so that the sawblade is mounted on the arbor, the centrally located mounting hole being defined by an inner peripheral surface, the centrally located mounting hole in the sawblade being bounded by a plurality of inner driven surfaces circumferentially spaced about the mounting hole and operatively engaging the outer drive surfaces on the arbor when the arbor is rotatably driven so that rotation of the arbor results in rotation of the sawblade in a rotational direction, the inner driven surfaces operatively engaging a respective outer drive surface at an interface during operation of the sawing apparatus so that an interface force results at each respective interface, the mounting hole in the sawblade having an inner diameter that is substantially greater than the outer diameter of the arbor so that the sawblade is radially shiftable relative to said arbor, whereby during a cutting operation the outer peripheral surface of the arbor is spaced from the inner peripheral surface of the mounting hole in the sawblade; and
    said drive surfaces and said driven surfaces together defining means for producing a radially inwardly directed radial component of the interface force at said interfaces during operation of the sawing apparatus and for effecting automatic self-centering of the sawblade on the arbor so that as the sawblade moves from a non-operational state in which the sawblade is at rest in a first position to an operational state in which the sawblade is rotating in a second position for performing cutting, the sawblade shifts radially relative to the arbor from said first position in which the central axis of the sawblade is spaced from the central axis of the arbor to said second position in which the central axis of the sawblade is coincident with the central axis of the arbor.

2. The sawing apparatus as recited in claim 1, wherein said means for producing a radially inwardly directed radial component of the interface force at said interfaces during operation of the sawing apparatus includes each of the plurality of inner driven surfaces extending between a first point and a second point, the second point being located radially outwardly of the first point, with each of the inner driven surfaces being configured so that a second radial extending through the second point is positioned forwardly, with respect to the rotational direction, of a first radial extending through the first point.

3. The sawing apparatus as recited in claim 1, wherein said means for producing a radially inwardly directed radial component of the interface force at said interfaces during operation of the sawing apparatus includes each of the plurality of outer drive surfaces extending between a first point and a second point, the second point being located radially outwardly of the first point, with each of the outer drive surfaces being configured so that a second radial extending through the second point is positioned forwardly, with respect to the rotational direction, of a first radial extending through the first point.

4. The sawing apparatus as recited in claim 1, wherein said means for producing a radially inwardly directed radial component of the interface force at said interfaces during operation of the sawing apparatus includes every other one of the plurality of outer drive surfaces extending between a first point and a second point, the second point being located radially outwardly of the first point, with each of the outer drive surfaces being configured so that a second radial extending through the second point is positioned forwardly, with respect to the rotational direction, of a first radial extending through the first point.

5. The sawing apparatus as recited in claim 1, wherein said means for producing a radially inwardly directed radial component of the interface force at said interfaces during operation of the sawing apparatus includes every other one of the plurality of inner driven surfaces extending between a first point and a second point, the second point being located radially outwardly of the first point, with each of the inner driven surfaces being configured so that a second radial extending through the second point is positioned forwardly, with respect to the rotational direction, of a first radial extending through the first point.

6. The sawing apparatus as recited in claim 1, wherein each driven surface has a base at which the driven surface intersects said inner peripheral surface of the hole in the sawblade at an intersection region, a plurality of said bases each being provided with means for relieving stress concentrations at the base of the driven surface.

7. The sawing apparatus as recited in claim 6, wherein said means for relieving stress concentrations includes said base of each of said driven surfaces being provided with a curved cutout having a radius of curvature.

8. A sawing apparatus, comprising:

an arbor having a central axis and an outer diameter, the arbor possessing an outer peripheral surface, the arbor being rotatably driven about the central axis during operation of the sawing apparatus and being provided with a plurality of outer drive surfaces circumferentially disposed in spaced apart relation along the outer peripheral surface of the arbor; and one-piece sawblade of circular configuration mounted on the arbor to effect cutting through rotation of the sawblade in a rotational direction about a rotational axis, the sawblade having an outer cutting edge and a center opening receiving the arbor, the center opening of the sawblade being substantially larger than the outer diameter of the arbor so that the sawblade is radially shiftable relative to the arbor, the center opening in the sawblade being bounded by a plurality of inner driven surfaces circumferentially spaced about the central opening for operatively interfacing with the drive surfaces on the arbor so that rotation of the arbor results in rotation of the sawblade, each of the plurality of inner driven surfaces extending between a first point and a second point, the second point being located radially outwardly of the first point, each of the inner driven surfaces being configured so that a second radial extending through the second point is positioned forwardly of a first radial extending through the first point with respect to the rotational direction, each of said inner driven surfaces being oriented at an angle of at least 55° with respect to a tangent of a circle concentric with the sawblade and passing through a point on said inner driven surface.

9. The sawing apparatus as recited in claim 8, wherein said angle at which each of said inner driven surfaces is oriented with respect to the tangent of a circle concentric with the sawblade is at least 60°.

* * * * *